United States Patent

[11] 3,625,862

| [72] | Inventor | Melvin J. Freamo<br>North Tonawanda, N.Y. |
|---|---|---|
| [21] | Appl. No. | 732,000 |
| [22] | Filed | May 24, 1968 |
| [45] | Patented | Dec. 7, 1971 |
| [73] | Assignee | E. I. du Pont de Nemours and Company<br>Wilmington, Del. |

[54] LIQUID COMPOSITIONS CONTAINING A PALLADIUM (11) COMPOUND AND THE USE THEREOF IN THE PRODUCTION OF VINYL ACETATE FROM ETHYLENE
6 Claims, 1 Drawing Fig.

| [52] | U.S. Cl. | 252/429, 260/497 |
|---|---|---|
| [51] | Int. Cl. | C07c 67/04 |
| [50] | Field of Search | 252/429; 260/497 A |

[56] References Cited

UNITED STATES PATENTS

| 3,119,875 | 1/1964 | Steinmetz et al. | 252/429 X |
|---|---|---|---|
| 3,121,673 | 2/1964 | Riemenschneider et al. | 252/429 X |
| 3,360,482 | 12/1967 | McKeon et al. | 252/428 |

FOREIGN PATENTS

| 1,008,622 | 11/1965 | Great Britain | 260/497 A |
|---|---|---|---|
| 1,067,850 | 5/1967 | Great Britain | 260/497 A |

*Primary Examiner*—Patrick P. Garvin
*Attorney*—John J. Klocko, III

ABSTRACT: A liquid composition containing acetic acid, up to 20 weight percent water, a palladium (II) compound, and copper and alkali metal salts which provide the following at specified concentrations: copper, lithium, sodium and potassium cations; and, acetate and chloride and/or bromide anions. Also, a method wherein such a composition is reacted with ethylene to produce vinyl acetate.

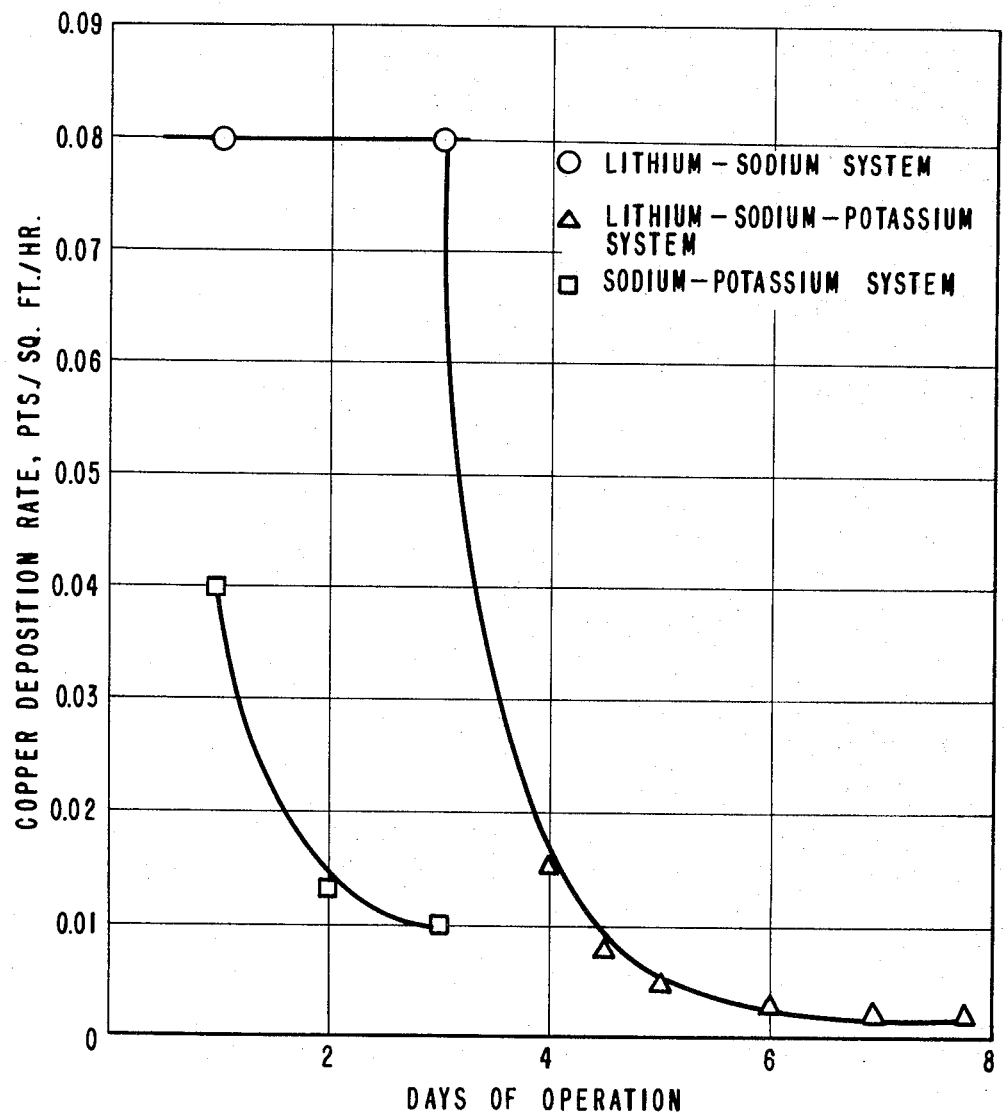

LIQUID COMPOSITIONS CONTAINING A PALLADIUM (II) COMPOUND AND THE USE THEREOF IN THE PRODUCTION OF VINYL ACETATE FROM ETHYLENE

BACKGROUND OF THE INVENTION

It is known (Moiseev et al., Doklady Akad. Nauk S.S.S.R. 133, 337 [1960]) that vinyl acetate can be produced by reacting ethylene with acetic acid containing palladium chloride and sodium acetate. The acetic acid reaction medium preferably also contains an oxidizing agent such as a cupric salt whose purpose is to prevent reduction of the palladium salt to metallic palladium. The cupric salt, which becomes reduced during the reaction, may be reoxidized in situ, for continued use by means of oxygen supplied with the ethylene to the liquid reaction medium (hereinafter called the "working medium"). Alternatively the reduced working medium may be reoxidized or regenerated for reuse by oxidation with air or oxygen in a separate operation as described in Belgian Pat. No. 608,610, British Pat No. 1,003,396 French Pat. No. 2,458,317 and U.S. Pat. Nos. 3,238,247 and 3,360,482. These Belgian, British and French patents disclose that it is advantageous also to have present in the working medium an alkali metal salt and a metal chloride.

It is also known, as disclosed in the above patents, that the presence of minor amounts of water in the working medium results in the coproduction of vinyl acetate and acetaldehyde. The mol ratio of vinyl acetate: acetaldehyde in the product depends largely upon the water content of the working medium, which ratio increases as the water content is decreased. Any or all of the acetaldehyde produced can be oxidized to acetic acid in any desired way, e.g., externally of the system, by well-known methods. Since the overall cyclic process consumes 1 mol of acetic acid per mol of vinyl acetate produced, acetic acid produced from the coproduced acetaldehyde can be used to supply all or any desired part of the acetic acid requirements of the process.

Methods in which the working medium is reacted in the same reactor simultaneously with ethylene and oxygen, often referred to as "single-stage" methods, involve the explosive hazards of handling and/or reacting mixtures of ethylene and oxygen. Such hazards are completely avoided in cyclic methods in which the reactions with ethylene and oxygen are carried out separately in separate reactors, which cyclic methods are often referred to as "two-stage" methods.

The working medium most generally proposed for two-stage type processes comprises acetic acid, a soluble palladium (II) compound, copper acetate, sodium chloride, and, optionally, sodium acetate. Such a medium gives good yields of vinyl acetate and acetaldehyde, based on the ethylene consumed, and regeneration of the medium in the second stage reactor is rapid. However, a major problem associated with the use of such a sodium-based working medium is its poor reactivity or working performance in the first or synthesis reactor where vinyl acetate is produced, particularly at high copper loadings of the working medium, which generally will be in slurry form. Additionally, such a medium generally is very prone to cause plugging of the process lines. If potassium salts are used to replace the sodium salts in such a medium, the resulting working medium slurry is very prone to assume the consistency of applesauce, causing frequent and highly objectionable plugging of flow lines and the still employed for removing product vinyl acetate from the working medium. If the sodium salts are replaced by lithium salts, a working medium results which tends to cause unduly high byproduct formation. Furthermore, such lithium-based working media are more difficult to regenerate in the second-stage, and they tend to deposit hard difficult-to-remove deposits of CuCl on equipment surfaces such as the surfaces of the first-stage reactor and the still employed to remove vinyl acetate product.

The presence of chloride and/or bromide anions in such working media is highly desirable if not essential since they promote the reaction of ethylene with the medium to produce vinyl acetate. Sodium, potassium and lithium cations tend to inhibit the promotional effect of such halide anions. At the same molar concentration, lithium cations exhibit the least and sodium the greatest inhibiting effect. However, at the same weight percent concentration, their inhibiting effects are roughly equivalent. Despite the inhibiting action of such alkali metal cations on the promotional effect of the halide anions, the presence of such cations, nevertheless, is desirable as a source of the halide anions and part of the acetate anions desired.

The present invention is based upon the discovery of certain liquid compositions of a type generally resembling the liquid media heretofore proposed, which liquid compositions, however, are characterized by exhibiting high reactivities in both stages of the cyclic process, particularly at high copper loadings. Furthermore, they may be used without incurring to any serious extent the plugging problems characteristic of sodium-based or potassium-based media, and no significant deposition of solids on equipment surfaces is encountered with their use.

SUMMARY OF THE INVENTION

This invention relates to certain liquid compositions and to their use in a method for producing vinyl acetate from ethylene.

The liquid compositions of the invention contain acetic acid, up to 20 weight percent water, a palladium (II) compound, and copper and alkali metal salts which provide in the composition: (a) from 2 to 15 weight percent copper cations; (b) from 0 to 3 weight percent lithium cations; (c) from 0.2 to 3.5 weight percent sodium cations; (d) from 0.3 to 2 weight percent percent potassium cations; (e) from 0.5 to 6 weight percent total lithium, sodium and potassium cations; and (f) from 0.5 to 1.2 gram atoms of halide anions which are chloride and/or bromide anions for each gram atom of copper cations, with the balance of the anion requirements of said salts consisting essentially of acetate anions.

The method of the invention is a method for producing vinyl acetate wherein such a liquid composition is employed as the liquid working medium and is continuously cycled between a first reactor (A) in which it is reacted with ethylene to produce vinyl acetate and at least partially reduced working medium, and a second reactor (B) in which the at least partially reduced working medium is reoxidized with oxygen before being recycled to reactor (A), and wherein the vinyl acetate produced in the first reactor is removed from the at least partially reduced working medium before the latter is cycled to the reactor (A).

DETAILED DESCRIPTION AND PREFERRED EMBODIMENTS

The palladium (II) compound component of the liquid compositions used as working media, or more specifically, the Pd (II) cation thereof, functions to catalyze the reaction of ethylene with the medium to produce vinyl acetate. The anion portion of the Pd (II) compound is not particularly important since only small amounts of the catalyst are required or contemplated. Any Pd (II) compound which is sufficiently soluble in the medium to provide a Pd (II) cation concentration effective to catalyze the reaction can usually be used. Examples of such compounds are palladous chloride, palladous bromide, palladous acetate and the alkali metal chloro- and bromopalladites. The palladium (II) compound may be charged as one or more of such salts; or palladium metal, e.g., in the form of palladium black, or its oxide or carbonate may be charged and dissolved in the medium. Palladium (II) cation concentrations from 0.00001 to 0.5 molar or higher are effective. The preferred concentrations are 0.001 to 0.05 molar. The copper cation component of the liquid composition employed as working medium may be supplied as copper (cupric and/or cuprous) acetate, or in part as copper acetate and in part as copper (cupric and/or cuprous) chloride or bromide. Alternatively, the copper cation component may be formed in situ in the medium, e.g., by dissolving metallic copper, a copper oxide or a copper carbonate therein. Copper cation concentrations as low as 2 percent and as high as 15 percent, based on the total weight of the composition, are usable. A working medium having a high vinyl acetate synthesis capacity per cycle is obviously highly desirable, and for this reason, a medium having a high copper loading, e.g., at least 7 percent, is preferred. However, at copper loadings greater than about 13 percent, the liquid medium will be a heavy slurry or relatively poor mobility. Accordingly, the preferred copper cation concentrations range from 7 to 13 percent and the most preferred concentrations are 8 to 11 percent.

The alkali metal cation components of the liquid compositions employed as working media may be supplied as the appropriate alkali metal acetates or the corresponding chlorides or bromides, or as both such acetates and such chlorides or bromides. The total concentration, based upon the composition, for the lithium, sodium and potassium cations should be at least 0.5 percent and generally should not exceed 6 percent. These limits arise since at the lower copper concentrations the alkali metals should be present in approximately equimolar quantities with copper. The upper limit results since higher concentrations cause excessive inhibition of the vinyl acetate synthesis reaction. The preferred and most preferred, respectively, total concentrations for the above alkali metal cations are 1.5 to 5 percent and 2 to 4 percent.

Considering individually the above alkali metal cation components of the liquid compositions employed as working media, the usable concentrations of each, based upon the composition weight, are: for lithium cations, 0 to 3 percent; for sodium cations, 0.2 to 3.5 percent; and for potassium cations 0.3 to 2 percent. The presence of lithium is not essential, particularly at low copper loadings. At high copper loadings, the presence of lithium cations is distinctly desirable in that their presence improves working medium fluidity and general handling characteristics. However, lithium cation concentrations greater than about 3 percent are distinctly undesirable in that they cause excessive inhibition of the vinyl acetate synthesis reaction. The presence of at least 0.2 percent sodium cations and at least 0.3 percent potassium cations is necessary to achieve a low cuprous chloride deposition rate and to insure that any cuprous chloride deposited on equipment surfaces will be in a readily removable form. However, sodium cation concentrations greater than about 3.5 percent cause excessive inhibition of the vinyl acetate synthesis reaction and result in thick slurries having poor flow characteristics. Slurries having poor flow characteristics also result when potassium cations are present at concentrations exceeding about 2 percent because of the formation of undesirable fibrous cuprous chloride crystals at such high potassium cation concentrations. The preferred and most preferred, respectively, concentrations for each of these three cations are: for lithium cations, 0.4 to 1.6 percent and 0.7 to 1.3 percent; for sodium cations, 0.5 to 2.4 and 0.7 to 1.4 percent; and for potassium cations, 0.5 to 2.3 and 0.6 to 1.5 percent.

The essential halide anion components of the liquid compositions employed as working media are chloride and/or bromide anions. They may be supplied initially, solely or partially as the appropriate copper (cupric and/or cuprous) halides, or solely or partially as the appropriate lithium and/or sodium and/or potassium halides. They may also be supplied by the addition of hydrogen chloride or hydrogen bromide; these react with the metal acetates present to convert them in situ to the corresponding metal halides and acetic acid. The total concentration of such halide anions, including any that may be present in undissolved salt form, e.g., as precipitated cuprous halide, should generally not be less than 0.5 gram atom, nor more than 1.2 gram atoms, preferably 0.7 to 1.1 gram atoms, and most preferably 0.9 to 1.1 gram atoms, of such halide anions for each gram atom of copper cations (total) present in the composition. When operating the first stage or vinyl acetate synthesis reactor at a high copper conversion level (discussed below), a major portion of the total halide ions will be present as precipitated cuprous halide. Since some halide anions must be present in dissolved form during the synthesis reaction, it is necessary that sufficient total halide anions be present in the working medium so that not all will be precipitated out as cuprous halide in the synthesis reactor. Thus, sufficient of the above halides should be present so that the working medium in the synthesis reactor will contain dissolved chloride and/or bromide anions at a concentration of 0.003 to 0.5, preferably 0.03 to 0.3, gram atoms per liter, in addition to the halide anions that will be present in precipitated from as cuprous halide.

The copper and alkali metal salt components of the liquid compositions employed as working media, as indicated above, generally will be present as halide (chloride and/or bromide) and acetate salts of those metals. They will normally supply the required 0.5 to 1.2 gram atoms of halide anions per gram atom of copper cations and generally the balance of the anion requirements of such alkali metal and copper salts will consist essentially of acetate anions. However, in addition to halide and acetate anions, minor amounts of other anions such as the anions of a soluble acid stronger than acetic acid, e.g., sulfuric acid, may be present.

Although the method of the invention is particularly directed to the production of vinyl acetate, it will be understood that, depending upon such factors as the water content of the working medium and the ethylene pressure under which the reaction in the first reactor is carried out, the method can also be practiced to produce substantial quantities of acetaldehyde along with the vinyl acetate. Actually, a preferred embodiment of the invention involves practicing the method to produce vinyl acetate together with a substantial amount of acetaldehyde, e.g., from 0.5 to 1 mole per mole of vinyl acetate, thereby to provide acetaldehyde for oxidation to acetic acid for use in supplying at least part of the acetic acid requirements of the process. In general, the higher the water content of the working medium and the lower the ethylene pressure, the greater will be the mol ratio of acetaldehyde : vinyl acetate in the reaction products. Water contents up to about 20 weight percent. based upon the total weight of the composition, may be employed, particularly when relatively high proportions of acetaldehyde in the product are desired. If it is desired to keep the production of acetaldehyde at a minimum, water contents as low as possible should, of course, be employed. This condition may be achieved by separating water as completely as possible from the working medium which is reacted with ethylene in the first reactor. Such separation may be effected by distillation methods or by supplying acetic anhydride in appropriate amounts to the working medium feed stream into the first reactor. When the coproduction of substantial amounts of acetaldehyde is desired, e.g., for use as precursor for part or all of the acetic acid requirements of the process, water contents of from about 3 to 12 weight percent are generally preferred, and those from 3 to 10 percent are most preferred, although higher concentrations up to about 20 percent are usable.

Since water is continuously formed during the oxidation of the reduced working medium in the second reactor of the cycle, it must be removed at some stage in the cycle in order to maintain a constant water level in the working medium in the synthesis or first-stage reactor. Water may be removed from the medium between the second and first reactors; however, it is generally most conveniently removed along with the vinyl acetate and acetaldehyde products from the effluent working medium from the first reactor. Thus, when such effluent is passed to a stripping still to remove vinyl acetate and acetaldehyde, water will also be removed. The amount of water generally removed at this stage of the cycle will usually be sufficient to maintain the desired water content in the first-stage reactor, particularly when the coproduction of vinyl acetate and acetaldehyde is desired.

As indicated previously, the copper salt component functions as a redox system, the purpose of which is to maintain the palladium compound catalyst in its active palladium (II)++state. To accomplish that effect, the copper compound becomes reduced from the cupric state to the cuprous state in the first-stage reactor and the working medium in which the copper is present primarily in the reduced or cuprous state is hereinafter referred to as the "reduced working medium." The cuprous component of the working medium is, of course, reoxidized to the cupric state by reaction of the reduced working medium with oxygen in the second stage of the process. Thus, the copper component of the effluent from the second-stage reactor will be primarily in the cupric state and such effluent is hereinafter referred to as the "oxidized working medium."

Operation of the cyclic process at a high synthesis capacity requires the use of a working medium having a high copper loading and also the operation of the first-stage or synthesis reactor at a high copper conversion level, i.e., at a high level of conversion of the copper from the cupric to the cuprous state. As a practical matter, the copper conversion level in the first-stage reactor should generally be at least 70 percent, i.e., 70 to 99 percent of the copper present in the effluent from that reactor should be in the cuprous state, the preferred conversion level being 85 to 95 percent. The reaction in the first-stage reactor should be effected under constant environment conditions which are readily achieved by employing efficient back-mixing therein so that the composition of the working medium throughout the first-stage reactor will be essentially the same and constant and will be also essentially the same as the composition of the effluent from that reactor. In contrast, however, the composition of the working medium fed to that reactor will be quite different in that substantially all of the copper therein will be present as cupric copper.

The amount of vinyl acetate and acetaldehyde produced per cycle will depend upon the copper loading of the working medium employed, the rate of circulation of the medium in the cycle and the net copper conversion across the cycle. If the copper conversion in the second-stage reactor is 80 percent, and the copper conversion in the second-stage reactor is 80 percent, and the copper conversion in the first-stage reactor is also 80, the effluent from the second-stage reactor will contain 20 percent of the copper in the cuprous form, whereas the effluent from the first-stage reactor will contain 80 percent of the copper in the cuprous form. Under those circumstances, the net conversion of copper from the oxidized or cupric form to the reduced or cuprous form would be 80 percent minus 20 percent, or 60 percent, which would be the net copper conversion across the cycle or loop. At such a net copper conversion, the productivity of the system, in terms of the number of pounds of copper reduced (from the cupric to the cuprous state) per hour is obtained by multiplying the percent copper loading of the working medium by 0.6, and then multiplying that result by the circulation rate. Productivities calculated in this manner correlate quite well with the actual production of vinyl acetate and acetaldehyde since the actual amount of vinyl acetate plus acetaldehyde produced is generally equal to from around 95 to 98 percent of that represented by the amount of copper actually converted in the cycle from the cupric to the cuprous state.

The reaction of ethylene with the working medium in the first stage of the cycle will generally be carried out at carried out at temperatures up to 150° C., e.g., 50° to 150° C. At lower temperatures, the reaction generally proceeds too slowly to be practical, whereas higher temperatures offer no particular advantages and may result in excessive production of byproducts. The preferred temperatures range from about 90°-130b$L$ C. It will generally be advantageous to operate the first-stage reactor at ethylene pressures greater than atmospheric and pressures of from about 50 to 2,000 p.s.i.g. are generally usable. The reaction rate at lower pressures is generally lower than desired, while higher pressures, although usable, usually result in no added advantage. The preferred ethylene pressures range from 100 to 300 p.s.i.g. Depending upon such factors as the catalyst (palladium compound) concentration, the reaction temperature and ethylene pressure, the residence time for the working medium in the first-stage reactor may be as low as 1 minute or a fraction of a minute, but usually will range from about 5 to 10 minutes. Higher contact times, e.g., up to 20 minutes or more, can be used but are not necessary.

The effluent working medium from the first-stage reactor will generally be passed to a stripping still from which the vinyl acetate and acetaldehyde products, along with byproduct water, will be removed as overhead product.

The residual working medium effluent from the stripping still will then be passed to the second-stage rector in which it is reacted with air, oxygen or oxygen-enriched air, whereby to reconvert cuprous copper to cupric copper. The second-stage reaction may be carried out in an oxidation tower or any type of reactor conventionally employed for contacting a liquid medium with a gaseous reactant. Provisions should be made for keeping the working medium agitated in the reactor to insure suspension of the solid components and to provide good contact of the medium with the gaseous oxygen reactant. The reaction usually will be effected at a temperature of at least 50° C., e.g., 50° to 150° C. or higher, to insure the desired reaction rate. The preferred temperatures range from about 80° to 130° C. Oxygen-partial pressures of about 0.01 to about 2 atmospheres or higher are generally suitable. The preferred partial pressures range from about 0.1 to about 1 atmospheres. Total air pressures of 0 to 200 p.s.i.g., preferably 90 to 130 p.s.i.g. are conveniently employed. The working medium effluent from the second-stage reactor is, of course, recycled to the first-stage reactor for reaction therein with further amounts of ethylene. Fresh or "makeup" acetic acid, to compensate for that consumed in the cycle, is conveniently fed to the working medium stream that is recycled from the second-stage reactor, although such makeup acetic acid may be added to the working medium at any desired other point in the cycle.

Working media of various compositions were employed to produce vinyl acetate in continuous cyclic operations carried out as a series of "loop tests." In such tests, the working medium was reacted with ethylene in an efficient backmixing first-stage reactor to produce vinyl acetate and acetaldehyde products and reduced working medium, which products and excess water were stripped from the reduced medium in a stripping or distillation column. The reduced working medium residue effluent from the stripping column was passed continuously to a second-stage reactor column in which it was reacted with air to reoxidize the working medium, i.e., reoxidize cuprous copper to cupric copper. The reoxidized working medium was then recycled to the first-stage reactor after the addition thereto of makeup acetic acid to maintain a constant working medium volume. The equipment was so arranged that a continuous and steady flow of the working medium passed through the various equipment pieces positioned in the form of a loop. In carrying out the test, 450 to 500 parts of the test working medium were prepared in a batch kettle from which the batch medium was pumped slowly into the loop which had been initially filled with acetic acid. As the medium entered the loop, corresponding amounts of acetic acid were removed by distillation in the still so as to maintain a constant volume of liquid in the loop. In all of the tests, both vinyl acetate and acetaldehyde were produced. The mol ratio of vinyl acetate: acetaldehyde in the product mixtures obtained generally varied from about 0.7:1 to 2:1. The combined amounts of vinyl acetate and acetaldehyde produced corresponded to yields of about 95 percent, based upon the amounts of copper actually converted from the cupric to the cuprous state in the first-stage reactor, i.e., the net copper conversion per cycle.

In the first of the loop tests, the following composition was prepared in the batch kettle and charged gradually to the loop as indicated above:

| | Parts by weight |
|---|---|
| Cupric acetate monohydrate | 122 |
| Sodium acetate | 10 |

| | |
|---|---|
| Sodium chloride | 35.8 |
| Glacial acetic acid | 283 |
| Water | 40 |
| PdCl₂ solution (22% PdCl₂, 62% H₂O, 16% HCl) | 0.7 |

When charged and employed in the loop, the above batch composition provided in the loop a working medium having the sodium, copper and water concentrations and the Cl:Cu ratio indicated for test A in table 1. Other batch compositions having approximately the same PdCl₂ content were similarly prepared and charged to the loop to provide therein working media having the component concentrations indicated for Tests B through H in table 1. Table 1 also sets forth the operating conditions for the various tests, whereas the test results are reported in table 2. The Cu deposition rates reported in table 2 were determined from the amount of copper salt, essentially CuCl, deposited in a given time on the known surface area of a titanium probe inserted into the working medium in the Stage 1 reactor. All equipment surfaces which contacted the working medium in the cycle were titanium surfaces.

gave high copper deposition rates. In contrast, the binary sodium-potassium medium of Test F gave a copper deposition rate that was markedly lower, although some plugging of flow lines resulted. In contrast to the results in Test A through F, the ternary lithium-sodium-potassium-based media of Tests G and H gave very low copper deposition rates, the medium of Test G being outstanding in this respect.

It will also be noted from the data of table 2 that the productivities in terms of copper converted per cycle were significantly higher when using the working media of Tests F, G and H. Thus, considering all of the factors evaluated, the working media used in Tests F, G and H were distinctly superior to those employed in Tests A through E. The ternary lithium-sodium-potassium medium of Test G was outstanding in all respects since its use resulted in the best productivity per cycle with essentially no plugging of flow lines and a very low copper deposition rate.

The drawing shows graphically the differences in copper deposition rates when using lithium-sodium, lithium-sodium-potassium, and sodium-potassium systems, such systems cor-

TABLE 1.—WORKING MEDIA COMPOSITIONS AND CONDITIONS OF USE

| Test | Concentrations, wt. percent | | | | | Gm. atom ratio, Cl:Cu | Temp., °C. | | Pressure p.s.i.g.[1] | | Cu conv., percent | | Circ. rate pts./hr. |
|---|---|---|---|---|---|---|---|---|---|---|---|---|---|
| | Li | Na | K | Cu | H₂O | | Stage 1 | Stage 2 | Stage 1 | Stage 2 | Stage 1 | Stage 2 | |
| A | | 3.2 | | 8 | 10 | 1:1 | 115 | 130 | 185 | 95 | 50 | 95 | 1,000 |
| B | 1.3 | | | 8.7 | 10 | 1:1.4 | 120 | 135 | 185 | 95 | 80 | 60 | 1,000 |
| C | | | 5 | 6.8 | 8 | 1:1 | 112 | 122 | 185 | 100 | 50 | 90 | 1,000 |
| D | 0.75 | 0.8 | | 8 | 8 | 1:1 | 115 | 130 | 185 | 95 | 75 | 92 | 700 |
| E | 0.9 | | 1.0 | 8.8 | 6 | 1:1 | 115 | 125 | 185 | 95 | 70 | 94 | 700 |
| F | | 2.8 | 0.9 | 8 | 7 | 1:1 | 120 | 125 | 185 | 95 | 80 | 96 | 700 |
| G | 0.7 | 0.8 | 0.9 | 7.6 | 8 | 1:1 | 117 | 127 | 185 | 95 | 88 | 96 | 700 |
| H | 0.3 | 1.5 | 0.8 | 7.2 | 8 | 1:1 | 120 | 125 | 185 | 95 | 90 | 96 | 700 |

[1] Pressure of ethylene in Stage 1 and of air in Stage 2.

TABLE 2.—RESULTS OF TESTS

| Test | Net Cu converted per cycle, percent | Cu converted/ cycle, pts. | Cu deposition[1] rate, pts./ft.²/hr. | Remarks |
|---|---|---|---|---|
| A | 45 | 3.6 | 0.08 | Frequent plugging of lines, particularly at base of Stage 2 reactor. High Cu deposition[1] rate. |
| B | 40 | 3.5 | 0.04 | Heavy deposition[1] of difficult-to-remove solids. |
| C | 40 | 2.7 | | At Cu loading of 4%, medium assumed consistency of applesauce and could not be circulated. |
| D | 67 | 5.4 | 0.08 | System circulated well, but Cu deposition[1] rate was high. |
| E | 64 | 5.6 | 0.07 | System circulated well, but heavy deposition[1] of difficult-to-remove solids. |
| F | 76 | 6.1 | 0.01 | Some plugging of lines, particularly at base of Stage 2 reactor; relatively low Cu deposition[1] rate. |
| G | 84 | 6.4 | 0.001 | Excellent operability; low Cu deposition[1] rate. |
| H | 86 | 6.2 | 0.02 | Some plugging, particularly at base of Stage 2 reactor; relatively low Cu deposition[1] rate. |

[1] Deposition of CuCl (reported as Cu equivalent) on surfaces of Stage 1 reactor.

It will be seen from the results for Tests A, B and C that the use of media containing a single alkali metal involved severe operating difficulties including the repeated plugging of flow lines with the sodium-based and potassium-based media and the deposition on the Stage 1 reactor surfaces of difficult-to-remove solids with the lithium-based medium. Since the solids deposited on equipment surfaces are primarily cuprous chloride, such deposition involves a withdrawal of copper values from the working medium. Deposition of such solids at high rates is characteristic of sodium-based and lithium-based media. While the solids deposited from a sodium-based medium are softer and more easily removed than those deposited from a lithium-based medium, both such media deposit solids at high rates. The potassium-based medium of Test C could not be operated under the reaction conditions indicated at copper loadings greater than about 4 percent without plugging of the system due to the precipitation of solids in a fibrous form in the medium which cause the medium to assume the consistency of applesauce. When such applesauce consistency resulted, circulation of the medium in the loop became impossible. Thus, in order to maintain the working medium at a pumpable consistency, it was necessary to replace part of the medium in the loop with acetic acid until the copper content was reduced to about 4 percent.

It will also be noted from table 2 that although the binary alkali metal lithium-sodium and lithium-potassium media of Tests D and E operated reasonably well in the cycle, those media, like the monoalkali metal media of Tests A, B and C, responding, respectively, to the working media indicated for Tests D, G and F of table 1. As will be seen from the drawing, the rate of deposition for the sodium-lithium system (D) remained high at 0.08 for 3 days, at which time the composition of the system was altered so as to provide the lithium-sodium-potassium medium of Test G, whereupon the deposition rate fell rapidly and at about the seventh day leveled out at about 0.001. The rate of deposition for the sodium-potassium system (F) was much lower than that of the lithium-sodium system (D) and at the end of three days had fallen to only 0.01.

1. A liquid composition which consists essentially of acetic acid, up to 20 weight percent water, a palladium (II) compound which provides in said composition palladium (II) cations at a concentration of from 0.00001 to 0.5 molar, and copper and alkali metal salts which provide in said composition: (a) from 2 to 15 weight percent copper cations; (b) from 0 to 3 weight percent lithium cations; (c) from 0.2 to 3.5 weight percent sodium cations; (d) from 0.3 to 2 (e) percent potassium cations; (3) from 0.5 to 6 weight percent total lithium, sodium and potassium cations; and (f), for each gram atom of copper cations, from 0.5 to 1.2 gram atoms of halide anions from the group consisting of chloride anions, bromide anions, and mixtures of chloride and bromide anions, with the balance of the anion requirements of said salts consisting essentially of acetate anions.

2. A composition according to claim 1 which contains from 3 to 12 weight percent water and: (a) 7 to 13 weight percent copper cations; (b) 0.4 to 1.6 weight percent lithium cations; (c) 0.5 to 2.4 weight percent sodium cations; (d) 0.5 to 2.3 weight percent potassium cations; (e) 1.5 to 5 weight percent total lithium, sodium and potassium cations; and (f) from 0.7 to 1.1 gram atoms of halide anions for each gram atom of copper.

3. A composition according to claim 1 which contains 3 to 10 weight percent water and: (a) 8 to 11 weight percent copper cations; (b) 0.7 to 1.3 weight percent lithium cations; (c) 0.7 to 1.4 weight percent sodium cations; (d) 0.6 to 1.5 weight percent potassium cations; (e) 2 to 4 weight percent total lithium, sodium and potassium cations; and (f) from 0.9 to 1.1 gram atoms of halide anions for each gram atom of copper cations.

4. A composition according to claim 1 wherein the halide anions are chloride anions.

5. A composition according to claim 2 wherein the halide anions are chloride anions.

6. A composition accordingly to claim 3 wherein the halide anions are chloride anions.

* * * * *

PO-1050
(5/69)

UNITED STATES PATENT OFFICE
CERTIFICATE OF CORRECTION

Patent No. 3,625,862          Dated December 7, 1971

Inventor(s) Melvin J. Freamo

It is certified that error appears in the above-identified patent and that said Letters Patent are hereby corrected as shown below:

Claim 1, Line 8, "(e)" should read -- weight --.

Claim 1, Line 9, "(3)" should read -- (e) --.

Signed and sealed this 2nd day of May 1972.

(SEAL)
Attest:

EDWARD M. FLETCHER, JR.
Attesting Officer

ROBERT GOTTSCHALK
Commissioner of Patents